United States Patent Office 3,637,646
Patented Jan. 25, 1972

3,637,646
FIBER-REACTIVE PHTHALOCYANINESULFON-AMIDOARYLAZO - STILBENYLPYRAZOLONE DYESTUFF
Gerd Hoelzle, Liestal, Switzerland, assignor to Ciba Limited, Basel, Switzerland
No Drawing. Filed Oct. 15, 1968, Ser. No. 767,820
Claims priority, application Switzerland, Oct. 24, 1967, 14,825/67; Sept. 9, 1968, 13,509/68
Int. Cl. C09b 29/38, 47/04; D06p 1/38
U.S. Cl. 260—147                 15 Claims

ABSTRACT OF THE DISCLOSURE

Phthalocyanine dyestuffs of the formula

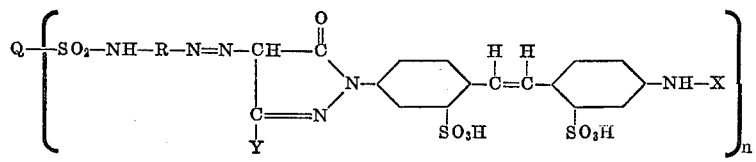

in which Q represents the residue of a phthalocyanine, $n$ stands for a number between 1 and 2 inclusive, R represents a residue of the benzene series, X represents a fibre-reactive residue and Y represents a methyl, carbalkoxy or carboxyl group. Such compounds are valuable dyestuffs for dyeing especially cellulosic fibres brilliant green shades of good general fastness especially to light and wet treatment.

---

This invention provides new phthalocyanine dyestuffs of the formula (1)
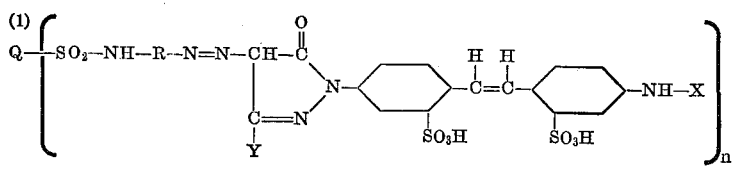

in which Q represents a phthalocyanine residue preferably containing at least one sulphonic acid group, $n$ stands for a number between 1 (incl.) and 2 (incl.), R represents a residue of the benzene series, X represents a fibre-reactive residue and Y represents a methyl, carbalkoxy or carboxyl group.

It provides, in particular, dyestuffs of the Formula 2 in which Y, X and $n$ have the meanings ascribed to them in Formula 1, Pc represents the residue of a metal-free phthalocyanine or of a phthalocyanine containing cobalt or especially copper or nickel, $m$ stands for 1 or 2, $W_1$ $W_2$ and $W_3$ each represents a hydroxyl group or a substituted or unsubstituted amino group and $p$, $q$ and $r$ each represents a number within the range of from 0 to 3, the sum of $p+q+r$ being at least 1 and the sum of $p+q+r+n$ being a number between 3 (incl.) and 4 (incl.).

Compounds that are specially valuable are those corresponding to the formula

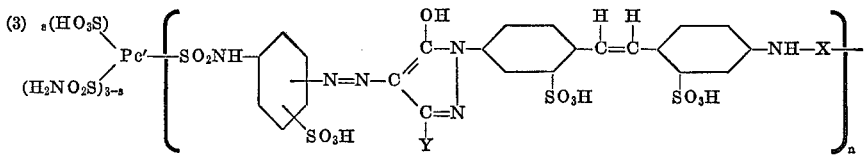

in which $n$, Y and X have the meanings ascribed to them in Formula 1, Pc′ represents a nickel-phthalocyanine or copper-phthalocyanine residue, $s$ stands for a number within the range of from 1 to 3 and the sum of $s+n$ amounts to a number between 3 (incl.) and 4 (incl.).

The new dyestuffs may be manufactured by condensing an amine of the formula (4)
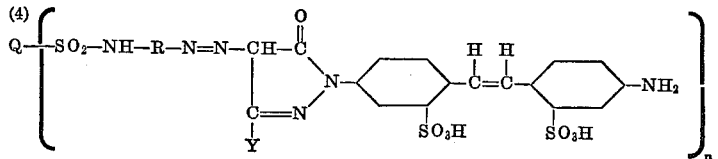

or a corresponding amine derived from Formula 2 or 3 with an acylating agent yielding the residue X, or by condensing a sulphochloride of the formula (5)          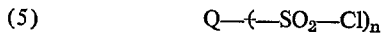

(2)
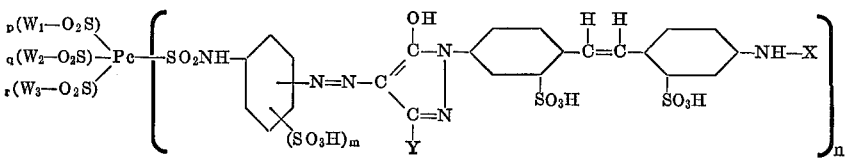

or a corresponding sulphochloride derived from Formula 2 or 3 with an amine of the formula (6)
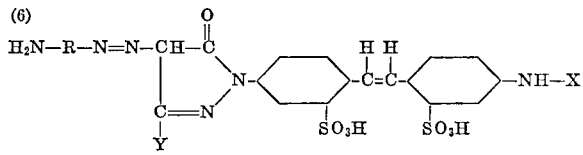

or a corresponding amine derived from Formula 2 or 3, or by coupling a diazo compound of an amine of the formula (7) $\quad Q\text{—}(\text{—}SO_2NH\text{—}R\text{—}NH_2)_n$ or a corresponding amine derived from Formula 2 or 3 with a coupling component of the formula (8)
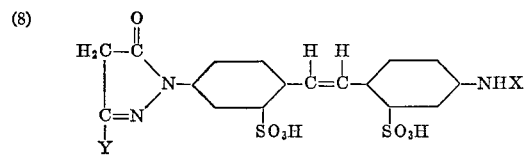

The amines corresponding to Formula 4 may be obtained by methods known per se, for example, by coupling diazo compounds derived from amines of the formula $Q\text{—}(SO_2NH\text{—}R\text{—}NH_2)_n$ with coupling components of the formula

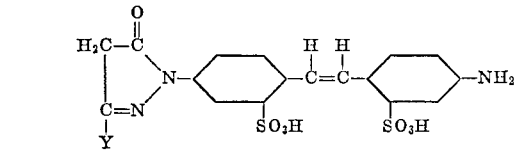

The amines of Formula 7 to be used as starting materials may be obtained by condensing the corresponding phthalocyanine-sulphochlorides with diaminobenzenes of the formula $H_2N\text{—}R\text{—}NH_2$ that may be monoacetylated and/or substituted and, if necessary, subsequently splitting off the acetyl group.

The following, in particular, are given as examples of diaminobenzenes of the type mentioned: 1,3-diaminobenzene-4-sulphonic acid, 1,4 - diaminobenzene - 3-sulphonic acid or the monoacylated derivatives thereof, 1,3- or 1,4-diaminobenzene, 1,3-diaminobenzene-4-carboxylic acid, 1,4-diaminobenzene-3-carboxylic acid, 1,4-diaminobenzene-2,5-disulphonic acid, 1,4-diaminobenzene-3,6-disulphonic acid, 1,4-diaminobenzene-3,5-disulphonic acid, 1,3 - diaminobenzene-4,6-disulphonic acid, 1,3-diaminobenzene-4,5-disulphonic acid, 1,4 - diamino-3-carboxybenzene - 5-sulphonic acid, 4,4'-diaminodiphenyl-2-sulphonic acid, 4,4'-diaminodiphenyl-2,2'-disulphonic acid, 4,4' - diaminostilbene-2,2'-disulphonic acid and 2,2'-diaminodiphenylsulphone-4-sulphonic acid or the monoacylated derivatives of these compounds as well as substituted derivatives of the above-mentioned diaminobenzenes that may be monoacylated, for example, those also containing a chlorine atom or a methyl, ethyl, methoxy or ethoxy group, for example, 1,3-diamino-4-methyl-, ethyl-, methoxy-, ethoxy- or chloro-benzene, 1,4-diamino-3-methyl-, ethyl-, methoxy-, ethoxy- chloro or -sulpho-methylbenzene, 1,3-diamino-2- or -4-methyl-, chloro- sulphomethyl- or carboxymethylbenzene-5-sulphonic acid, 1,3-diamino-2,4- or -4,6 - dimethylbenzene-5-sulphonic acid, 1,3-diamino-2,4,6-trimethylbenzene-5 - sulphonic acid, 1,3 - diamino-2- or -4-methyl-5-sulphonic acid amide and 1,3-diamino-2- or -4-methyl-5-methylsulphonylbenzene.

The phthalocyanine-sulphohalides used in the preparation of the intermediate products may be obtained, for example, by reacting metal-free phthalocyanines or phthalocyanines containing cobalt or especially copper or preferably nickel with chlorosulphonic acid or from the phthalocyanine-di- to -tetrasulphonic acids by reaction with acid halogenating agents, for example, phosphorus halides, thionyl chloride or chlorosulphonic acid.

Depending on the method of manufacture adopted, the sulphonic acid groups in the phthalocyanine molecule are in 4-position or 3-position, this depending on whether 4-sulphophthalic acid is used as starting material or whether they are prepared by sulphonation or direct sulphochlorination of the phthalocyanine.

The phthalocyanine-sulphohalides so obtained are condensed with the above-mentioned monoacylated diaminobenzenes and the sulphohalide groups that do not participate in the reaction are hydrolysed, either simultaneously or subsequently, or reacted with ammonia or an aliphatic amine, for example, methylamine, ethylamine, β-hydroxyethylamine, β-sulphatoethylamine, taurine, methylaminoethane-2-sulphonic acid, or an aromatic amine, for example, aniline, toluidine, metanilic acid, orthanilic acid, sulphanilic acid, anthranilic acid and so forth.

The phthalocyanine derivatives obtained in this manner are subsequently saponified, diazotized, and the diazo compound is coupled with a coupling component of Formula 8, in which, however, the group —NHX is replaced by the group —NH₂.

Fibre reactive groups, that is to say, groups capable of reacting with the hydroxyl groups of cellulose with formation of a covalent bond, that may be mentioned are the chloromaleinylamino groups, the propionylamino grouping, monochloro- and dichloro-crotonylamino group, the acrylamino groups and especially groupings containing a labile substituent which are easy to split with removal of the pair of electrons forming the bond, for example, aliphatically bound sulphuric acid ester groups and aliphatically bound sulphonyl or sulphonyloxy groups or halogen atoms, especially an aliphatically bound chlorine atom. Advantageousy, these labile substituents are situated at α- or β-position of an aliphatic residue which is bound to the dyestuff molecule through an aminocarbonyl or aminosulphonyl group; in the case of the dyestuffs which contain halogen atoms as labile substituents, the said exchangeable halogen atoms may also be present, for example, in an acetyl residue or in α- and β-position of a propionyl residue. Examples of such residues are chloro- or α,β-dichloropropionylamino groups or α-chloroacetylamino groups. The replaceable halogen atoms are, however, preferably present in a heterocyclic residue which preferably contains 2 or 3 hetero atoms, especially nitrogen atoms, for example, a phthalazine, pyridazine, pyridazone, quinoxaline, quinazoline, oxazole or thiazole ring, but especially a pyrimidine or more particularly a triazine ring, for example, in a grouping of the formula

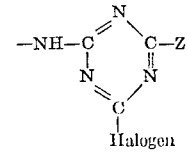

in which Z represents a hydrogen atom, an amino group that may be substituted, an etherified hydroxyl or mercapto group or a halogen atom or an alkyl, aryl or aralkyl group. The halogen atoms are, for example, bromine atoms, but preferably chlorine atoms. Of special interest is the use of dyestuffs which contain the grouping of the formula

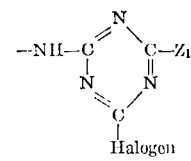

in which $Z_1$ represents a chlorine atom, a —NH₂ group or the residue of an aliphatic or aromatic amine, and also those fibre-reactive groups in which the replaceable substituent is a quaternary ammonium or hydrazinium group bound, in particular, to a carbon atom of a heterocyclic residue, that is to say, a group of the formula

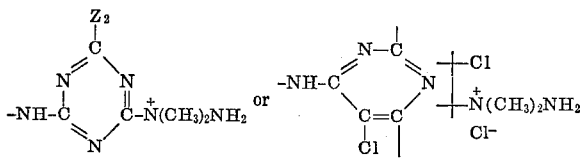

in which $Z_2$ represents a hydrogen atom, an amino group that may be substituted or an etherified hydroxyl or mercapto group.

Suitable acylating agents which contain one or more reactive groups and which can be reacted with the aminoazophthalocyanine dyestuffs prepared in accordance with the instructions given above are, for example, the anhydrides or chlorides of the acids corresponding to the above-mentioned aliphatic acylamino residues, for example, acrylic acid, propiolic acid, chloromaleic acid, chloroacrylic acid, $\alpha,\beta$ - dibromopropionic acid, $\beta$ - chloropropionyl acid and the like, but especially the halides corresponding to the heterocyclic reactive residues, that is to say, for example, the following: 2 - halogenobenzthiazole- or -oxazole-carboxylic or -sulphonic acid chloride, 3,6 - dichloropyridazine - 5 - carboxylic acid chloride, tetrachloropyridazine, 4,5 - dichloropyridazon - (6)- yl - propionic acid chloride, 4,5 - dichloro - 1 - phenyl-pyridazone - carboxylic or -sulphonic acid chloride, 4,5-dichloropyridazone - propionic acid chloride, 1,4 - dichlorophthalazine - carboxylic or -sulphonic acid chloride, 2,3 - dichloroquinoxaline - carboxylic or -sulphonic acid chloride, 2,4 - dichloroquinazoline - carboxylic or -sulphonic acid chloride, 2,4,6 - trichloro- or 2,4,6 - tribromopyrimidine and the derivatives thereof which contain, for example, in 5-position a cyano, nitro, methyl, ethyl, carbamide, sulphamide, carbomethoxy, carbalkoxy, acyl (for example, benzoyl, acetyl or propionyl), alkenyl (for example, allyl or chlorovinyl) group or a substituted alkyl group (for example, a carboxy-methyl, chloromethyl or bromomethyl group), 2,4,5,6 - tetrachloro- or 2,4,5,6- tetrabromopyrimidine, 2,6 - dichloro- or 2,6 - dibromo-4 - carboethoxypyrimidine, 2,4,5 - trichloropyrimidine, 5 - nitro - 6 - methyl - 2,4 - dichloropyrimidine, 2,4 - dichloropyrimidine - 6 - carboxylic acid chloride, 2,4 - dichloropyrimidine - 5 - carboxylic acid chloride, 2,6 - dichloro- or 2,6 - dibromopyrimidine-4- or -5-carboxylic acid or sulphonic acid amide or -4- or -5-carboxylic acid or sulphonic acid chloride, 2,4 - dichloropyrimidine - 5 - sulphonic acid, 2,4 - dichloro - 5 - chloromethyl-6-methylpyrimidine, 2,4 - dibromo - 5 - bromomethyl - 6 - methylpyrimidine, 2,4 - dichloro - 5 - chloromethylpyrimidine, 2,4 - dibromo - 5 - bromomethylpyrimidine, 2,5,6 - trichloro - 4 - methylpyrimidine, 2,6 - dichloro - 4 - trichloromethylpyrimidine or especially 2 - methanesulphonyl - 4,5-dichloro - 6 - methylpyrimidine, 2,4 - dimethanesulphonyl-5 - chloro - 6 - methylpyrimidine, 2,4,6 - trichloro-1,3,5-triazine or 2,4,6 - tribromo - 1,3,5 - triazine, 4,6 - dichloro-1,3,5 - triazines which are substituted at 2-position by an aryl or alkyl residue, for example, a phenyl, methyl or ethyl residue, or by the residue of an aliphatic or aromatic mercapto or hydroxyl compound bound through the sulphur atom or oxygen atom respectively, or especially by an —$NH_2$ group or the residue of an aliphatic, heterocyclic or aromatic amino compound bound through its nitrogen atom. Compounds of the type defined that may be mentioned the residues of which can be bound to the triazine nucleus in 2-position by reaction with trihalogenotriazines are, for example, as follows: aliphatic or aromatic mercapto or hydroxyl compounds, for example, thioalcohols, thioglycollic acid, thiourea, thiophenols, methyl alcohol, ethyl alcohol, isopropyl alcohol, glycollic acid, phenol, chlorophenols or nitrophenols, phenolcarboxylic acids, phenolsulphonic acids, naphthols, naphtholsulphonic acids and so forth, but especially ammonia and compounds containing acylatable amino groups, for example, hydroxylamine, hydrazine, phenylhydrazine, phenylhydrazine sulphonic acids, carbamic acid and the derivatives thereof, semi- and thiosemi-carbazides and -carbazones, methylamine, ethylamine, isopropylamine, methoxyethylamine, methoxypropylamine, dimethylamine, diethylamine, methylphenylamine, ethylphenylamine, chloroethylamine, ethanolamines, propanolamines, benzylamine, cyclohexylamine, morpholine, piperidine, piperazine, aminocarbonic acid esters, aminoacetic acid ethyl esters, aminoethanesulphonic acid and N-methylaminoethanesulphonic acid, but especially aromatic amines, for example, aniline, N-methylaniline, toluidines, xylidines, chloroanilines, para- or meta-aminoacetanilide, nitroanilines, aminophenols, nitrotoluidines, phenylenediamines, toluylenediamines, anisidine, phenetidine, diphenylamine, naphthylamine, aminonaphthols and diaminonaphthalenes, and especially anilines containing acidic groups, for example, sulphanilic acid, metanilic acid, orthanilic acid, anilinedisulphonic acids, aminobenzylsulphonic acids, aniline-, $\omega$-methane-sulphonic acid, aminodibenzoic acids, napthylaminomono-, di- and trisulphonic acids, aminobenzoic acids, for example, 1- or 2 - hydroxy - 5 - aminobenzoic acid, aminonaphtholmono-, di- and tri-sulphonic acids, aminobenzoic acid-sulphonic acids and so forth, and also coloured compounds or compounds having dyestuff characteristics, for example, 4-nitro - 4' - aminostilbenedisulphonic acid and aminoazo dyestuffs or aminoanthraquinones or phthalocyanines which also contain at least one reactive amino group.

The introduction of the triazine residues substituted in 2-position by the residue of a hydroxyl, mercapto or amino compound or ammonia may also be advantageously effected by first reacting the aminoazophthalocyanine dyestuff of Formula 4 obtained by coupling or condensation with a 2,4,6-tri-halogeno-1,3,5-triazine, especially cyanuric chloride, and then exchanging a halogen atom in the dihalogenotriazine residue or residues obtained by reaction with one or more of the above-mentioned compounds.

Futhermore, a $\beta$-chloropropionyl residue, an $\alpha,\beta$-dichloropropionyl residue or an $\alpha,\beta$-dibromopropionyl residue present in the dyestuffs prepared in the manner described above may subsequently be converted into an unsaturated acyl residue, for example, an acrylic residue or a chloroacrylic or bromoacrylic residue, in accordance with the invention, by elimination of hydrogen halide by means of agents having an alkaline reaction.

As has already been mentioned, the new dyestuffs may also be prepared in accordance with the invention by reacting a phthalocyanine-sulphohalide of Formula 5 by a method known per se directly with an aminoazo dyestuff of Formula 6 which already contains the reactive acylamino group. The manufacture of such aminoazo dyestuffs of Formula 6 may be effected by coupling a diazo compound of one of the above-mentioned diamines of the formula $H_2N$—R—$NH_2$, which is preferbaly monoacylated, with one of the above-mentioned coupling components of Formula 8 which, in turn, may be obtained by acylation of the corresponding 1-(4''-aminostilbenyl)-3-methyl (or 3-carboxy- or 3-carbalkoxy)-5-pyrazolone-2',2''-disulphonic acid with one of the above-mentioned fibre-reactive acylating agents.

In this embodiment of the process and in the following one, when the reactive grouping is a dihalogenotriazine residue or a monohalogeno- or dihalogeno-propionyl residue, this grouping can likewise be reacted, for example, with an amine, or hydrogen halide can be eliminated therefrom.

Finally, in a further embodiment of the process of the invention the new dyestuffs may be obtained by coupling in that diazotized of Formula 7, which may be obtained in the manner described above, are coupled with coupling components of Formula 8, the preparation of which is also described above. Diazotization of the above-mentioned diazo components may be carried out by a method known per se, for example, with a mineral acid, especially hydrochloric acid, and sodium nitrite, or, for example, with a solution of nitrosylsulphuric acid in concentrated sulphuric acid.

Coupling may also be carried out in known manner, for example, in an alkaline to slightly acid medium if necessary, in the presence of sodium acetate or a similar buffer which influences the rate of coupling, or a catalyst, for example, pyridine or a salt thereof.

The dystuffs obtained in accordance with the process of the invention and the modifications thereof are suitable for dyeing and printing a very wide variety of materials, for example, silk, wool and polyamide fibres, and especially polyhydroxylated materials of fibrous structure, including man-made fibres, for example, fibres made from regenerated cellulose, and natural fibres, for example, linen and especially cotton. Many of the dystsuffs display high affinity for the said nitrogenous materials in a slightly acid to acid bath, and the dyebath thus exhausts well. The dyeings obtained, especially dyeings on wool, possess good fastness to washing and milling.

The new dyestuffs are suitable for dyeing cellulose according to the pad-dyeing process in which the material is padded with an aqueous solution of the dyestuff, which may also contain a salt, and the dyestuff is fixed on the substratum by treatment with an alkali, preferably with the application of heat. The dyestuffs are however specially suitable for the so-called direct dyeing method or "exhaustion" method in which the goods are dyed in a high liquor-to-goods ratio. Dyeings obtained with the new dyestuffs generally possess good fastness to light and they are distinguished, in particular, by outstanding properties of wet fastness and by their brilliant green shades. Furthermore, the nickel-phthalocyanine dyestuffs of the invention, in particular, produce dyeings possessing very good fastness to light in the wet state.

Valuable and fast prints may also be obtained on cellulosic fibres with the dyestuffs of the invention when the dyestuffs are fixed on the substratum by a heat treatment in the presence of an alkali.

After dyeing or printing, it is advantageous to remove completely any unfixed dyestuff. To this end, the material is rinsed thoroughly in warm and cold water and then subjected to a soaping process in the presence of a nonionic dispersing and/or wetting agent.

The following examples illustrate the invention. Unless otherwise stated, the parts and percentages are by weight.

EXAMPLE 1

A quantity of the compound of the formula

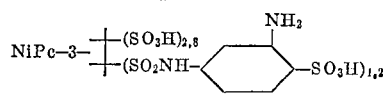

consuming 60 parts by volume of 2 N sodium nitrite solutions, which compound is prepared by condensing nickel-phthalocyanine - trisulphochloride monosulphonic acid with 1,3-phenylenediamine-4-sulphonic acid, is stirred in 1,000 parts of ice-water, dissolved with sodium hydroxide solution, and the solution is adjusted to pH 7. 62 parts by volume of 2 N sodium nitrite solution are added to the solution, followed by 80 parts by volume of concentrated hydrochloric acid. The mixture is stirred for 2 hours at 0 to 5° C., and then any excess of nitrite that may be present is destroyed with sulphamic acid.

54.1 parts of the compound of the formula

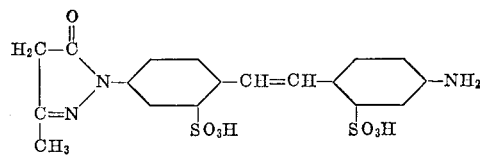

are dissolved in 400 parts by volume of a 2 N sodium carbonate solution and the solution is added to the diazo compound. The pH of the coupling mixture is adjusted to 7 by the addition of dilute sodium hydroxide solution, and the batch is stirred at 0 to 5° C. until coupling is finished.

The intermediate product so obtained is first acylated with 22.2 parts of cyanuric chloride at 0 to 5° C. and a pH of 5 to 7, and is then condensed with 20.8 parts of metanilic acid at 20 to 35° C. and a pH of 6 to 7. The dyestuff is precipitated by the addition of sodium chloride, isolated by filtration and then dried. When applied by the exhaustion process it dyes cellulosic fibres a brilliant green shade possessing good fastness to light and good fastness to wet treatments.

The same dyestuff may be obtained by condensing the intermediate product described above with 41.3 parts of the compound of formula

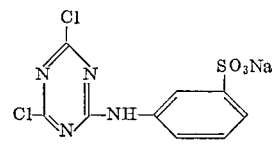

at 25 to 35° C. and a pH of 6 to 7.

EXAMPLE 2

A dyestuff having similar good properties may be obtained by replacing the phthalocyanine diazo component described in Example 1 with an equivalent amount of the compound of the formula

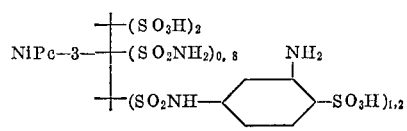

(prepared by condensing nickel-phthalocyanine-trisulphochloride monosulphonic acid with 1,3-phenylene-4-sulphonic acid in the presence of ammonia) and proceeding in the manner described in Example 1.

The identical dyestuff may be obtained by coupling the above-mentioned phthalocyanine diazo component with the equivalent amount of the compound of the formula

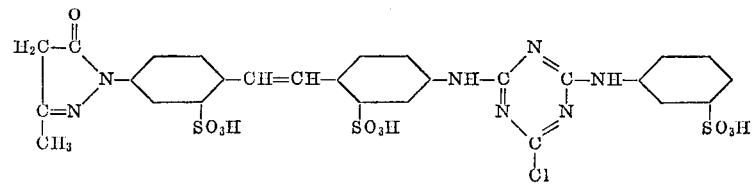

EXAMPLE 3

A dyestuff which dyes cellulosic fibres a somewhat more bluish shade possessing good properties of wet fastness may be obtained by replacing the nickel-phthalocyanine diazo component used in Example 1 with the corresponding copper-phthalocyanine compound and proceeding in the same manner.

Similar fibre-reactive dyestuffs may be obtained by treating the intermediate product obtained in the manner described in Example 1 with the following acylating agents:

2,4-dichloro-6-phenylamino-1,3,5-triazine-2',5'-disulphonic acid,
2,4-dichloro-6-phenylamino-1,3,5-triazine-2'-carboxyl-5'-sulphonic acid,
2,4-dichloro-6-phenylamino-1,3,5-triazine,
2,4-dichloro-6-phenylamino-1,3,5-triazine-4'-carboxylic acid,
2,4-dichloro-6-phenylamino-1,3,5-triazine-2'- or -4'-sulphonic acid,
2,4-dichloro-6-(β'-sulphatoethylamino)-1,3,5-triazine,
2,4-dichloro-6-aminotriazine,
2,4-dichloro-6-methoxytriazine,
2,4-dichloro-6-propoxytriazine,
2,4-dichloro-6-(β-ethoxy)ethoxytriazine,
2,4-dichloro-6-phenoxytriazine,
cyanuric chloride,
2,4,5,6-tetrachloropyrimidine,
2,4,6-trichloropyrimidine,
2,3-dichloroquinoxaline-6-carboxylic acid chloride,
2-methylsulphonyl-4,5-dichloro-6-methylpyrimidine,
α,β-dibromopropionic acid chloride,
acrylic acid chloride, and
tetrafluorocyclobutane-carboxylic acid chloride.

The dyestuffs obtained dye cellulosic fibres, fast, brilliant green shades.

EXAMPLE 4

Dyestuffs having the same shade and possessing similar good properties may be obtained by replacing the pyrazolone component used in Example 1 with the compound of the formula

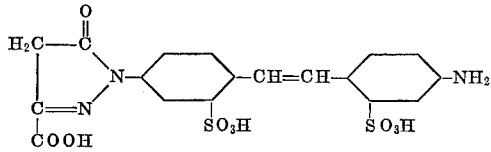

or the compound of the formula

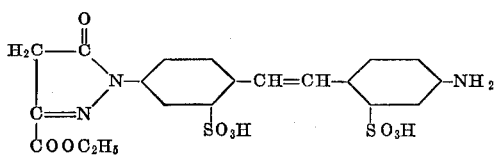

and following the same procedure.

EXAMPLE 5

A dyestuff yielding the same shade and possessing similar by good properties may be obtained by replacing the phthalocyanine diazo component used in Example 1 with an equivalent amount of the compound of the formula

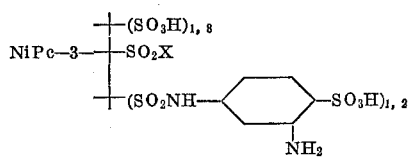

in which X represents an ethanolamine residue

(prepared by condensing nickel-phthalocyanine-trisulphochloride-moonsulphonic acid with 1,3-phenylenediamine-4-sulphonic acid in the presence of ethanolamine) and following the same procedure.

Dyestuffs having the same shade and similar by good properties may be obtained by using as starting material diazo components of the above formula in which, however, X represents a diethanoethylamine, 2-chloroethylamine, 2-sulphatoethylamine, 2-sulphoethylamine, methylamine, ethylamine, morpholine, aniline or aniline-3- or 4-sulphonic acid residue (prepared by condensing nickel-phthalocyanine - trisulphochloride - monosulphonic acid with 1,3 - phenylenediamine - 4 - sulphonic acid in the presence of the corresponding amine.)

(1) Pad-dyeing process in which the dyestuff is fixed by means of dry heat.—3 parts of dyestuff, 2 parts of sodium carbonate and 25 parts of urea are dissolved in 75 parts of water. A cotton fabric is impregnated with this solution, squeezed to a weight-increase of 75% and then dried at 80° C. The fabric is then exposed to dry heat (140° C.) for about 5 minutes, rinsed, and then soaped at the boil. The dyeing so obtained is fast to boiling.

(2) Pad-dyeing process in which the dyestuff is fixed by steaming.—1 part of dyestuff is dissolved in 100 parts of water. A cotton fabric is padded with this solution and squeezed so as to retain 75% of its dry weight of dyestuff solution. The impregnated fabric is dried and then impregnated at room temperature with a solution containing 10 grams of sodium hydroxide and 300 grams of sodium chloride per litre, squeezed so as to retain 75% of its dry weight of liquor, and steamed for 60 seconds at 100 to 101° C. The fabric is then rinsed, treated in a 0.5% sodium bicarbonate solution, rinsed, soaped at the boil for 15 minutes in a 0.3% solution of a non-ionic detergent, rinsed and dried.

(3) Direct-dyeing process.—2 parts of dyestuff are dissolved in 400 parts of water together with 80 parts of trisodium phosphate, and the solution is diluted to 4,000 parts. 80 parts of sodium chloride are added, 100 parts of a cotton fabric are entered into the dyebath, the temperature is raised to 60° C. within half an hour, 80 parts of sodium chloride are added, the temperature is raised to 80° C. within 15 minutes and the dyebath is kept at that temperature for half an hour. The fabric is then rinsed and soaped at the boil for 15 minutes in a 0..3% solution of a non-ionic detergent. The dyeing so obtained displays excellent properties of fastness.

I claim:

1. A phthalocyanine dyestuff of the formula

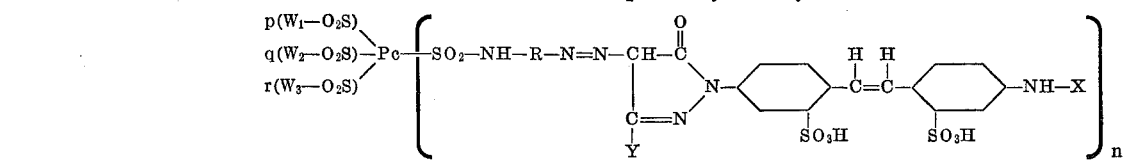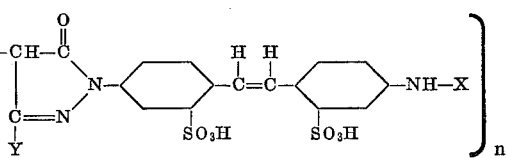

in which
n stands for a member between 1 and 2 inclusive,
R is a substituted or unsubstituted aromatic residue selected from the group consisting of
phenyl, diphenyl, stilbyl and diphenyl sulfone,
and, when the aromatic residue is substituted, the substituents are
sulfo, carboxy, chloro, methyl, ethyl, methoxy, ethoxy, or methylsulfonyl,
Pc represents a member of the group consisting of metal and metal-free phthalocyanine, said metal consisting of copper, cobalt or nickel,
$W_1$, $W_2$, and $W_3$ independently are hydroxy, amino, unsubstituted or substituted N-($C_1$-$C_2$ alkyl)-amino, said N-($C_1$-$C_2$ alkyl)-amino, when substituted, is substituted in the $C_1$-$C_2$ alkyl radical by
chloro, hydroxy, sulfato, sulfo, morpholino, phenyl, toluyl, sulfophenyl or carboxyphenyl,
unsubstituted or substituted aryl amino, said monocyclic aromatic amino, when substituted, being substituted by
methyl, sulphonic acid or carboxylic acid,
Y is methyl, carboxy, carbomethoxy, or carboethoxy,
X is a fiber reactive group capable of reacting with the hydroxyl groups of cellulose with formation of a covalent bond, and
p, q, and r each represents a number within the range of from 0 to 3, the sum of p+q+r being at least 1 and the sum of p+q+r+n being a number between 3 inclusive and 4 inclusive.

2. A phthalocyanine dyestuff as claimed in claim 1 of the formula

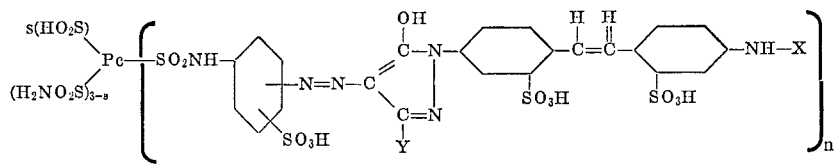

in which
Pc is nickel or copper phthalocyanine,
s is a number within the range of from 1 to 3, the sum of s+n being a number between 3 inclusive and 4 inclusive.

3. A phthalocyanine dyestuff as claimed in claim 2, in which the azo group is bound in the para-position or meta-position to the —SO₂NH bridge.

4. A phthalocyanine dyestuff as claimed in claim 2, in which X represents a triazine or pyramidine nucleus containing as substituents, groups capable of reacting with the hydroxyl groups of cellulose with formation of a covalent bond.

5. A phthalocyanine dyestuff as claimed in claim 2, in which X represents a triazine or pyrimidine nucleus containing, as substituents, chloring or methanesulfonyl, said substituents being capable of reacting with the hydroxyl groups of cellulose with formation of a covalent bond.

6. A phthalocyanine dyestuff as claimed in claim 2, in which X is 2-amino-4-chloro-1,3,5-triazinyl.

7. A phthalocyanine dyestuff as claimed in claim 2, in which X is α,β-dibromopropionyl, α-bromoacryloyl, β-chloropropionyl or acryloyl.

8. The dyestuff of the formula

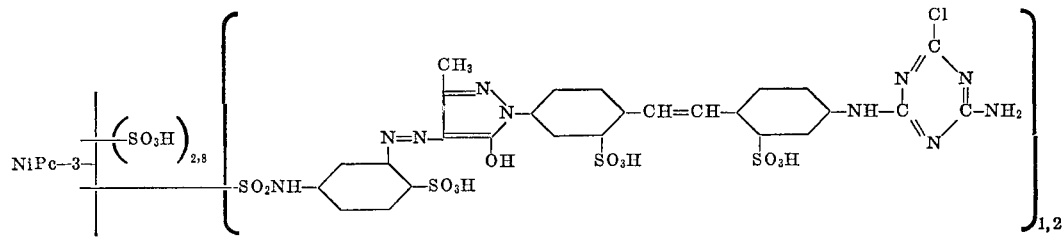

9. The dyestuff of the formula

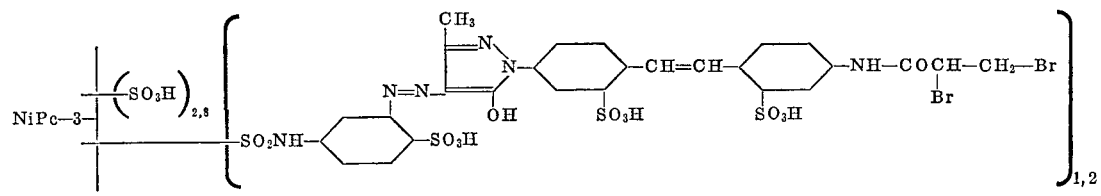

10. The dyestuff of the formula

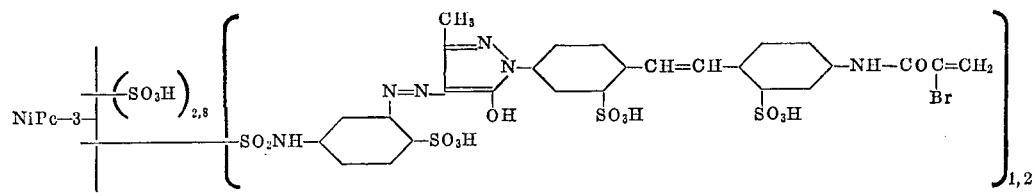

11. The dyestuff of the formula

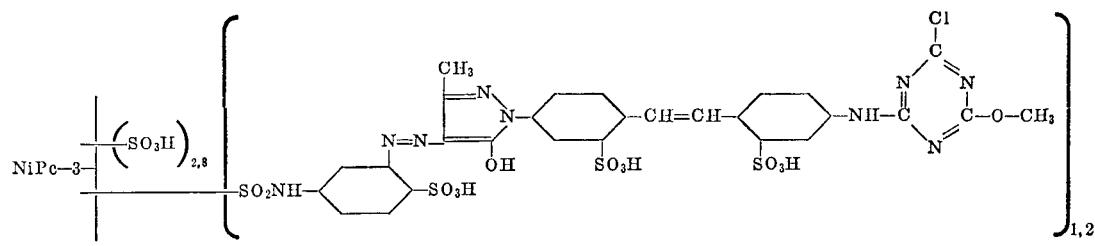

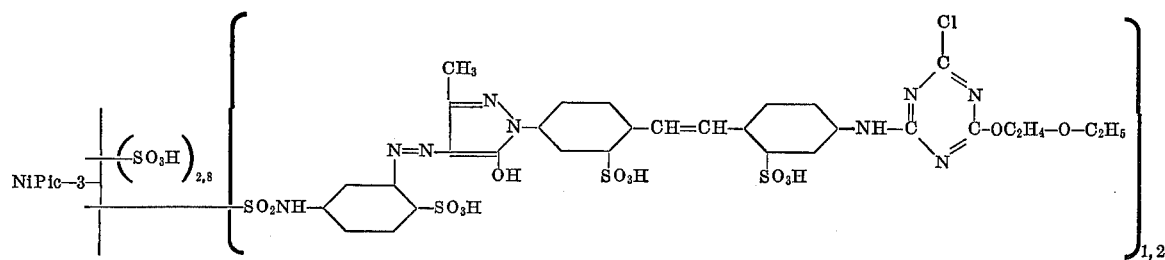
13. The dyestuff of the formula
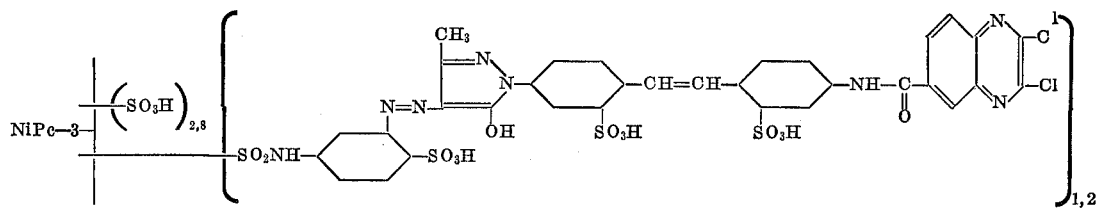
14. The dyestuff of the formula
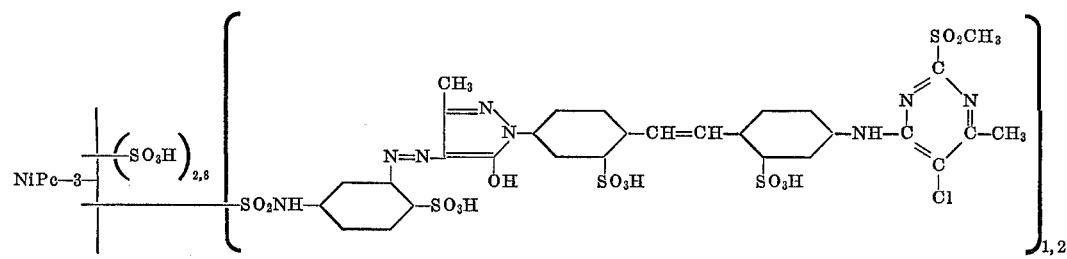
15. The dyestuff of the formula
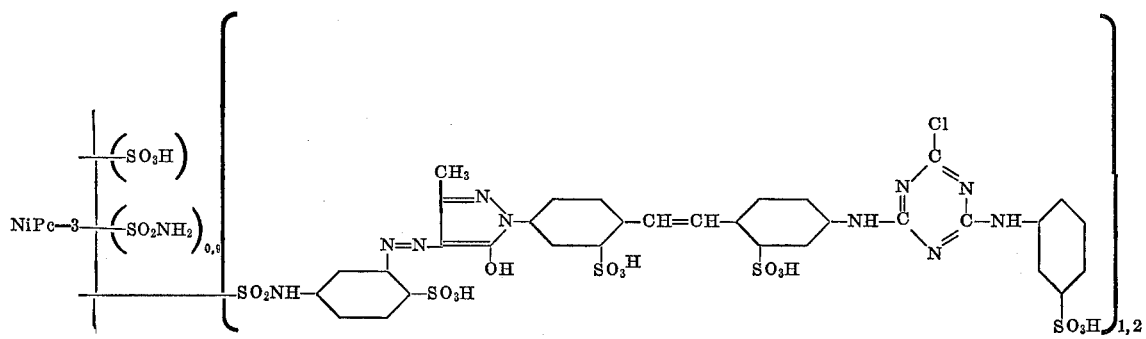
References Cited
UNITED STATES PATENTS
| | | | |
|---|---|---|---|
| 2,973,280 | 2/1959 | Bienert et al. | 260—147 X |
| 3,013,006 | 12/1961 | Bienert et al. | 260—147 |
| 3,133,050 | 5/1964 | Von Tobel | 260—146 |
FLOYD D. HIGEL, Primary Examiner
U.S. Cl. X.R.
8—4, 42 B, 42 R, 43; 260— 153, 154, 160, 162, 294.8 A, 310 A, 314.5

UNITED STATES PATENT OFFICE
CERTIFICATE OF CORRECTION

Patent No. 3,637,646   Dated January 25, 1972

Inventor(s) HOELZLE

It is certified that error appears in the above-identified patent and that said Letters Patent are hereby corrected as shown below:

Column 10, line 75, before "aryl", insert --- monocyclic ---.

Column 11, the right-hand portion of the structural formula in Claim 2 should read:

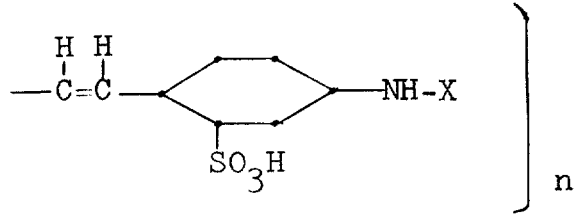

Column 13, before the first structural formula, insert --- 12. The dyestuff of the formula ---.

Column 13, the left-hand portion of the structural formula in Claim 15 should read:

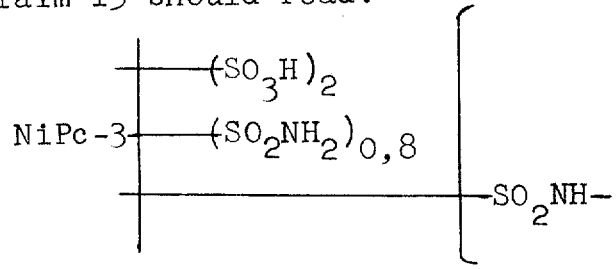

Signed and sealed this 8th day of May 1973.

(SEAL)
Attest:

EDWARD M. FLETCHER, JR.  ROBERT GOTTSCHALK
Attesting Officer         Commissioner of Patents